United States Patent [19]

Deane

[11] Patent Number: 4,712,443

[45] Date of Patent: Dec. 15, 1987

[54] MECHANICAL OVER-RIDE LINKAGES

[75] Inventor: Norman P. Deane, Rugby, England

[73] Assignee: AE PLC, Warwickshire, England

[21] Appl. No.: 806,803

[22] Filed: Dec. 10, 1985

[30] Foreign Application Priority Data

Dec. 13, 1984 [GB] United Kingdom ............ 8431455

[51] Int. Cl.⁴ ..................... G05G 1/14; G05G 11/00
[52] U.S. Cl. ........................... 74/470; 74/482; 74/513; 180/170
[58] Field of Search ........... 74/470, 479, 513, 482, 74/501 R, 471 R; 180/170

[56] References Cited

U.S. PATENT DOCUMENTS

| 2,575,901 | 11/1951 | Wheeler | 74/513 |
|---|---|---|---|
| 3,525,415 | 8/1970 | Bata et al. | 74/470 |
| 3,604,404 | 4/1969 | Pitchford | 123/102 |
| 3,704,635 | 12/1972 | Eshelman | 74/482 |
| 3,760,786 | 9/1973 | Marsh . | |
| 3,888,219 | 6/1975 | Rogerson | 74/513 |
| 3,939,726 | 2/1976 | Ahrens | 74/513 |
| 4,057,130 | 11/1977 | Robertson | 74/513 |
| 4,117,809 | 10/1978 | Kittler | 74/513 |
| 4,181,103 | 1/1980 | Sturdy . | |
| 4,320,673 | 3/1982 | Wegert | 74/513 |
| 4,335,624 | 6/1982 | Garman et al. | 74/470 |
| 4,362,138 | 12/1982 | Krueger et al. . | |
| 4,531,489 | 7/1985 | Sturdy . | |

FOREIGN PATENT DOCUMENTS

| 0114467 | 1/1984 | European Pat. Off. . | |
|---|---|---|---|
| 0085228 | 5/1985 | Japan | 74/482 |
| 1080809 | 8/1967 | United Kingdom . | |
| 1485446 | 9/1977 | United Kingdom . | |
| 2009463 | 6/1979 | United Kingdom . | |
| 1568239 | 5/1980 | United Kingdom . | |
| 2044845 | 10/1980 | United Kingdom . | |
| 2068456 | 8/1981 | United Kingdom . | |
| 2163214 | 2/1986 | United Kingdom . | |

Primary Examiner—Randolph A. Reese
Assistant Examiner—Peter M. Cuomo
Attorney, Agent, or Firm—Leydig, Voit & Mayer

[57] ABSTRACT

An override mechanism is disclosed for connection between the accelerator pedal of a vehicle and the fuel supply for normally enabling the driver to adjust the fuel supply but which can be overriden by speed limiting means. The throttle pedal is connected to move a lever to increase the fuel supply. This lever is pivoted to a clamp member via a shaft. The clamp member is clamped to a shaft whose angular movement adjusts the fuel supply. A spring resists pivoting movement of the lever with respect to the clamp member and therefore movement of the pedal is normally transmitted direct to the clamp and adjust the fuel supply. However, when the speed reaches an upper limit, an actuator pulls on a cable which is clamped to a part rigid with the clamp. Therefore the part moves relative to the cable carrier and the lever against the force of the spring. The clamp therefore closes the fuel supply.

10 Claims, 8 Drawing Figures

FIG. 5.

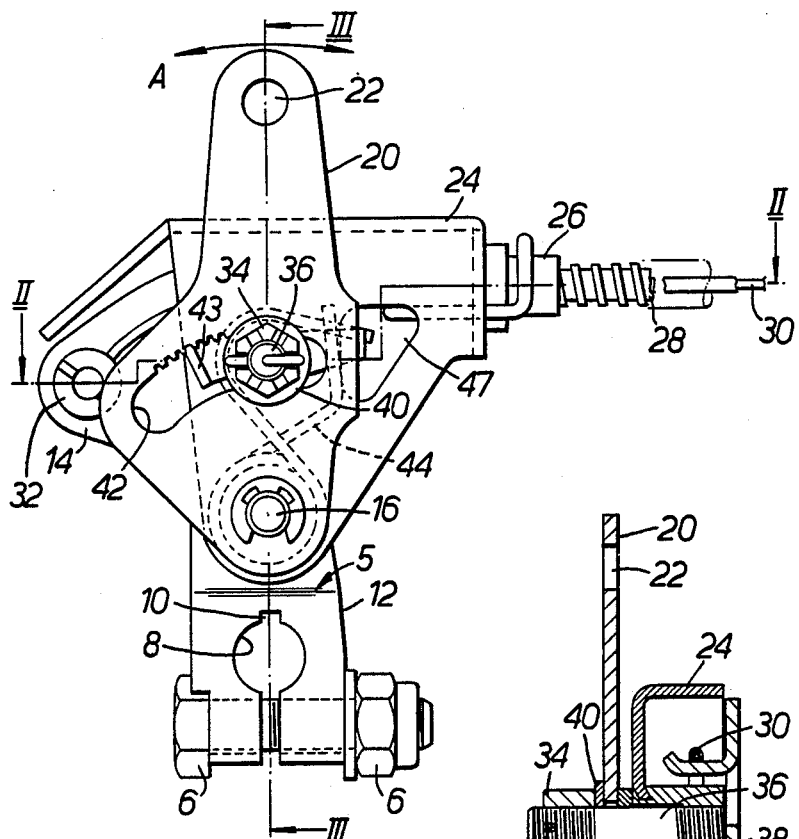
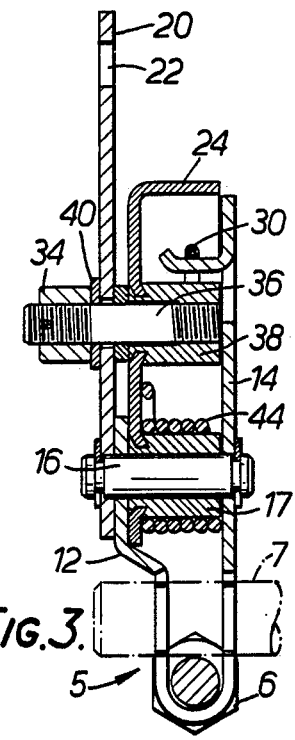
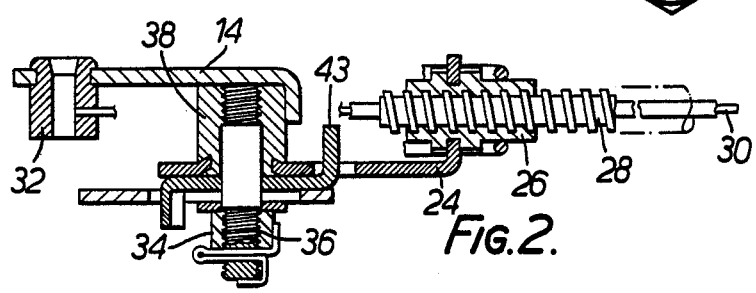
FIG.1.
FIG.3.
FIG.2.

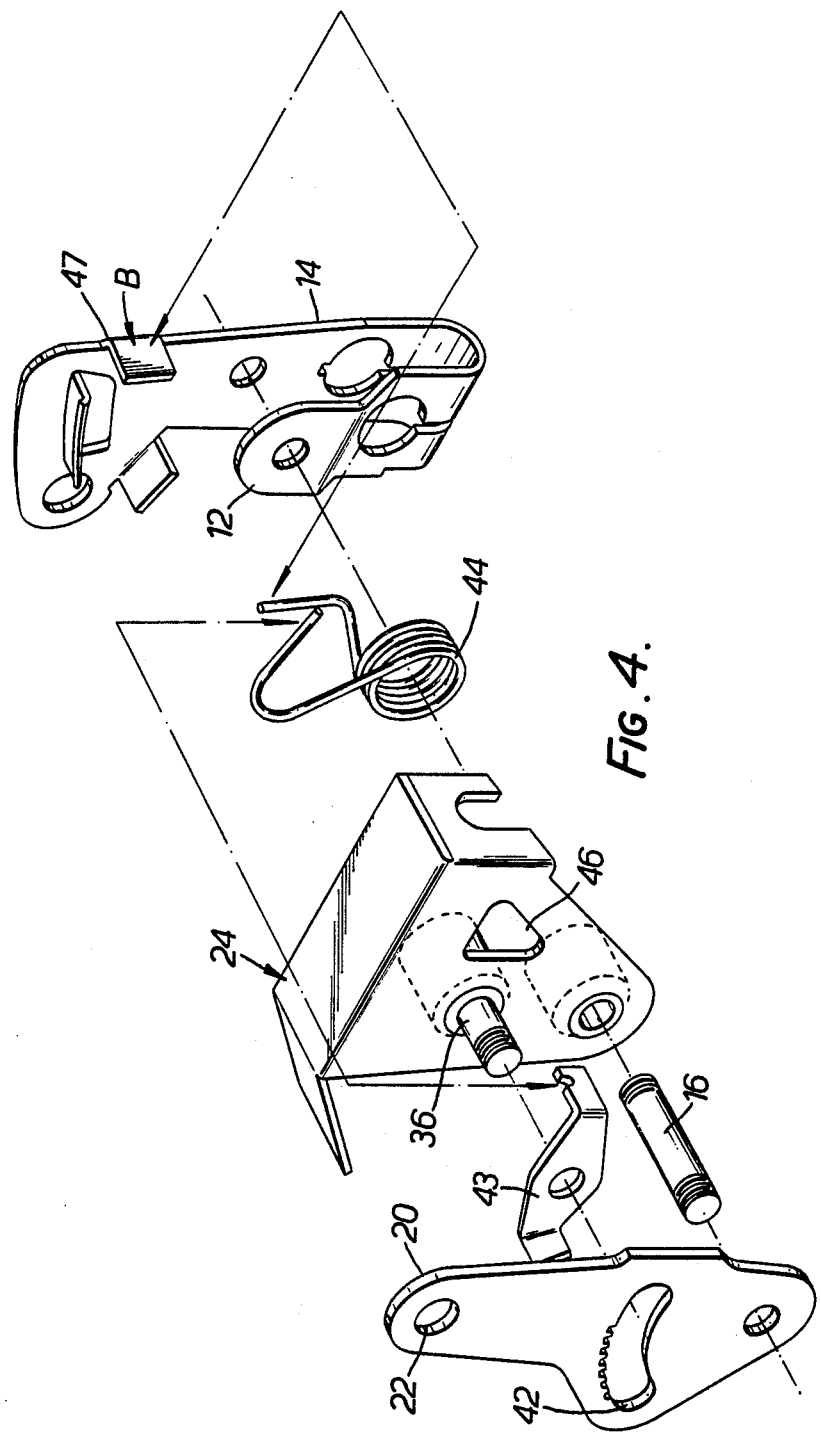

MECHANICAL OVER-RIDE LINKAGES

BACKGROUND OF THE INVENTION

The invention relates to mechanical linkages for translating movement between a first and a second member and which incorporate an override mechanism which enables movement of a third member to affect the translational movement between the first and second members. In one example of the invention to be described in more detail below, the mechanism is used for controlling the fuel supply to an engine such as the engine of a vehicle. Thus, in this example, the "first member" is a member whose movement is controlled by the vehicle driver (for example, the throttle or accelerator pedal) and the "second member" is a member connected to the engine's carburetor or diesel fuel injection pump and thus controls the fuel supply to the engine. The "third member" is a member controlled by an engine speed controlling or limiting system and enables the latter to "override" the driver's setting of the fuel supply; thus, the control or limiting system may thereby shut off or reduce the fuel supply in opposition to the action of the driver.

SUMMARY OF THE INVENTION

According to the invention, there is provided a mechanism for fitting between the fuel supply varying device of an engine and an operator's control which is movable by an operator to control the fuel supply to the engine, the mechanism comprising first and second members linked together for relative movement and forming a self-contained unit, the first member having means for connecting it to the said operator's control and the second member having means for connecting it to the fuel supply device, the unit including spring means biasing the members together such that they tend to move as one in response to movement of the operator's control which movement varies the engine's fuel supply via the said device, and override means connected between the two said members and capable of applying a force between them, in response to an engine speed controlling or limiting signal, the force acting in opposition to the said spring means and moving the said second member relative to the said first member to cause the said device to vary the engine's fuel supply independently of the operstor's control.

According to the invention, there is further provided a vehicle speed controlling or limiting system for retrofit to a vehicle after the disconnection from the vehicle engine's fuel supply varying device of the link normally connected thereto by which the operator's accelerator pedal controls the engine power, the system comprising a self-contained mechanical link unit, actuator means, and speed control or limiting means; the said unit having an input for mechanical connection to the said link, an output for mechanical connection to the said fuel supply varying device, and an override connection for connection to the said actuator means; the unit including first and second relatively movable members the first of which is connected to the said input and the second of which is connected to the said output, and spring means connected to the said members for biasing them into a datum relative position, the spring bias being sufficient such that the two members move as one in response to movement of the said link which is thereby transmitted to the fuel supply varying device; the control or limiting means being connectable to respond to engine or vehicle speed whereby attainment of a limit speed causes the control means to drive the actuator means to apply a force acting between the first and second members in opposition to the spring bias whereby the second member moves relative to the first member so as to cause the fuel supply varying device to reduce the engine power irrespective of the position of the said link.

DESCRIPTION OF THE DRAWINGS

Override mechanisms embodying the invention and for use in controlling the fuel supply to a vehicle engine will now be described, by way of example only, with reference to the accompanying drawings in which:

FIG. 1 is a side view of one of the mechanisms;

FIG. 2 is a section on the line II—II of FIG. 1;

FIG. 3 is a section on the line III—III of FIG. 1;

FIG. 4 is an exploded and simplified view showing part, only, of the mechanism of FIGS. 1 to 3;

DESCRIPTION OF PREFERRED EMBODIMENTS

Figure 5:
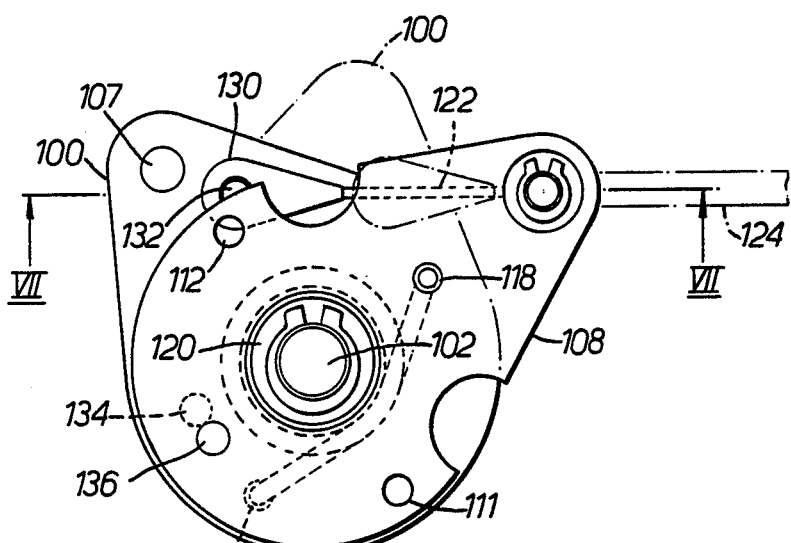
FIG. 5 is a side view of another of the mechanisms.

The mechanism of FIGS. 1 to 4 has a clamp 5 which, in use, is clamped, by means of nuts 6, to a shaft 7 (shown dotted in FIG. 3) which fits within the opening 8 and has a key locating in a keyway 10. This shaft is connected to the fuel supply control of the vehicle engine. For example, it may be connected to the carburettor throttle valve or to the injection pump of a fuel injection-type engine such as a diesel engine. In a manner to be explained, the mechanism illustrated conveys the movement of the driver's throttle or accelerator pedal to the shaft 7, turning it angularly about an anti-clockwise direction as viewed in FIG. 1 to increase the fuel supply and turning it in the reverse direction to reduce the fuel supply.

As shown more particularly in FIG. 3, the clamp 5 has integral front and rear parts 12 and 14. The front part 12 has a through bore through which extends a shaft 16, this shaft also freely passing through a block 17 and through a bore in the rear part 14. The rear part 14 extends upwardly for a greater distance than the front part 12 and increases in width as shown in FIGS. 1,2 and 4.

A lever 20 is connected by a rod (not shown) to the driver's throttle pedal, this rod being connected to the lever 20 via a hole 22 and being arranged so as to move the lever 20 to and fro in the direction of the arrow A, the lever being pivotable on the shaft 16.

Also pivotable on the shaft 16 is a cable support 24. The latter carries a block 26 (FIG. 2) in which is screw-threadedly received an outer cable casing 28 in which is received a flexible cable 30. The cable 30 passes through the casing 28 and is attached to a cable clamp 32 fixed to the widened upper portion of the part 14. The cable support 24 and the lever 20 can be rigidly clamped together by means of a nut 34 which is screwed onto the end of a bolt 36, the latter being screwed into a block 38 (FIG. 3). Friction washers 40 are placed on each side of the lever 20. As shown in FIGS. 1 and 4, the lever 20 is provided with a slot 42 so that the lever and the cable support 24 can be fixed together in particular relative angular position, for a purpose to be described. One edge of the slot 42 is serrated for engagement by a key 43 (FIG. 4) whose position in the serrations is held fast by the nut 34.

A spring 44 is coiled round the block 17. Both ends of the spring extend upwardly, one end partially encompassing and being received in a slot 45 in an end of the key 43 (see FIG. 4) which extends through a hole 46 in the cable suppor 24. The other end of the spring engages the surface B of a tongue 47 on the rear part 14 of the clamp 5.

The cable 30 is connected to an actuator (not shown) which forms part of a speed control or limiting system. This control system may be of any suitable form. For example, it may be arranged to be responsive to electrical signals representing the speed of the engine or the vehicle. When the speed reaches an upper limit, which has been preset, the system energises the actuator to apply a pulling force to the cable 30. It will be apparent that this action will have the effect of moving the part 14 relative to the cable support 24, the part 14 being moved relatively to the right as viewed in FIG. 1.

The operation will now be considered in greater detail.

Initially, it will be assumed that the engine speed control or limiting system referred to above is inoperatively, that is, the speed is below the upper limit. The cable 30 is therefore relatively slack. The driver can thus control the fuel supplied to the engine by moving the lever 20 to and fro in the directions of the arrow A, by means of his foot pedal. As the lever 20 is moved to the left as viewed in FIG. 1, it will tend to pivot on the shaft 16. Any such pivotting would of course prevent the angular movement of the lever 20 from being transmitted to the clamp 5. However, such pivotting movement is resisted, and prevented, by the bias of the spring 44. Any such pivotting movement would cause the key 43 to pivot about the axis of shaft 36, with the lever 20, and the movement would be transmitted by the spring 44 to the tongue 47 on the part 14 of the clamp 5. The clamp 5 therefore pivots with the lever 20, and the lever 20 and the clamp 5 therefore move together, as though they are more or less rigidly connected. Therefore, the shaft 7 (FIG. 3) is turned in an anti-clockwise direction (as viewed in FIG. 1) and increases the fuel supply to the engine. When the driver releases his foot pedal, the lever 20 moves to the right as viewed in FIG. 1 and the clamp 5 will move with it (turning the shaft 7 as well), this movement being assisted by the return spring (not shown) which would be provided on the actual fuel supply mechanism.

It will now be assumed that the speed reaches the upper limit because the driver is maintaining too high a setting of the fuel supply for the prevailing load on the engine. It is thus implicit in such a condition that the lever 20 will have been moved to the left (as viewed in FIG. 1), having turned the clamp 5 as well and rotated the shaft 7 in an anti-clockwise direction (as viewed in FIG. 1). When the control system detects that the speed has reached the upper limit, its actuator will pull on the cable 30. This will be transmitted via the cable clamp 32 and will move the part 14 (forming part of the cable clamp 5) to the right (as viewed in FIG. 1) relative to the cable support 24. This action will result in the cable clamp 5 pivotting, relative to the lever 20, in a clockwise direction as viewed in FIG. 1, the pivot axis being the shaft 16. This pivotting action will take place against the bias of the spring 44. The result will be that the fuel supply will be reduced or closed off by an appropriate amount, and this action will take place in spite of the fact that the driver may attempt to maintain maximum fuel supply by use of his foot pedal.

When the engine speed once more comes back below the limit, the actuator of the control system releases the cable 30, and the lever 20 and the clamp 5 will come back into alignment under the action of the spring 44.

The nut 34 enables the basic relative angular position between the lever 20 and the cable clamp 24 to be adjusted when setting up the system to suit the particular installation.

A modified mechanism will now be described with reference to FIGS. 5 to 8.

Figure 8:
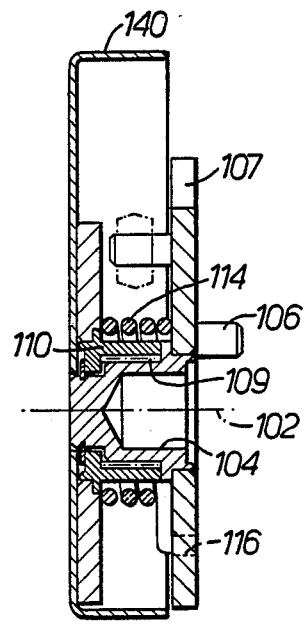
FIG. 8 is a section on the line VIII—VIII of FIG. 6.

As shown in FIG. 5, this mechanism has a fuel control lever 100 which is angularly moveable about an axis 102 and in use is connected to control the fuel supply of the vehicle engine. The lever 100 is connected to the fuel supply control in any suitable way. For example, it may be mounted on a shaft (not shown) extending into a hollow boss 104 (FIG. 8), this shaft carrying a member which is angularly moveable about the axis of the shaft to vary the fuel supply. The lever 100 can be connected to this member by means of a pin 106 and a bolt fitted in a hole 107 as shown in FIG. 8. However, other means of connecting the lever 100 to control the fuel supply of the vehicle engine are obviously possible.

The boss 104 (FIG. 8) rotatably supports a second lever 108 by means of a bearing 109 carrying a collar 110 so that the lever is in use angularly moved about the axis 102 in response to movement of the driver's throttle pedal. The movement of the driver's throttle pedal may be transmitted to the lever 108 in any suitable way. For example, a link may be bolted to the lever 108 by means of the holes 111 and 112, and the end of this link then pivotally connected to a rod which is in turn connected to the throttle pedal.

A coil spring 114 is coiled around the outside of the boss 104. One end of this spring is located in a bore 116 in the lever 100, while the other end is located in a bore 118 (see Fit. 5) in the lever 108.

The levers 100 and 108 are secured together on the boss 104 by means of a circlip 120.

A control cable 122, corresponding to the cable 30 of the mechanism of FIGS. 1 to 4, has an outer casing 124 which is clamped to the lever 108 by means of a cable clamp 126. The cable 122 has an end 130 which fits on to a pin 132 on the lever 100. Like the cable 30, the cable 122 is connected to the actuator mentioned above with reference to FIGS. 1 to 4 which forms part of the engine or vehicle speed control or limiting system.

Dowels 134 to 136 are rigidly located in holes in the levers 100 and 108 respectively. As shown in FIG. 5, these dowels normally abut against each other and are in fact urged together by the spring 114 which is given a sufficient pre-load for this purpose.

Figure 7:
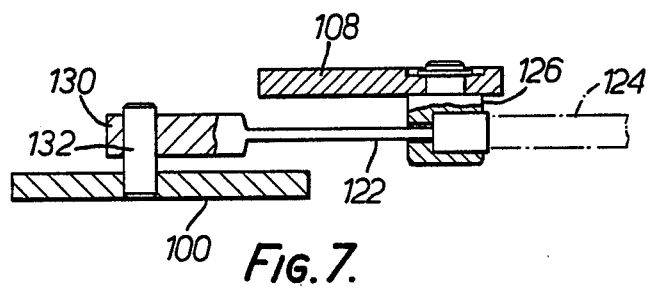
FIG. 7 is a section on the line VII—VII of FIG. 5.
Figure 6:
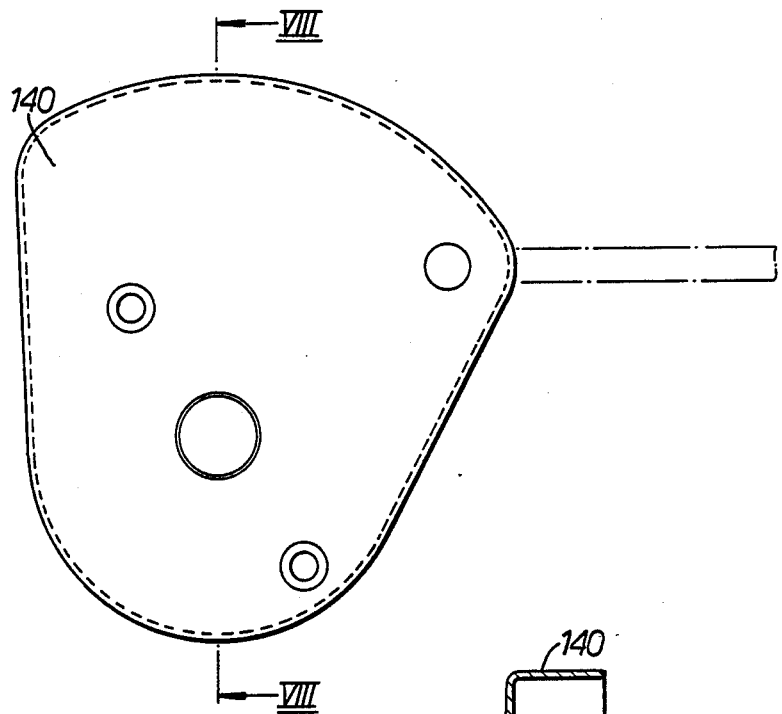
FIG. 6 is a side view of the mechanism of FIG. 5 with a cover in place.

The mechanism is enclosed within a cover 140 shown in FIG. 6 and 8 but omitted from FIGS. 5 and 7. The cover 140 has through holes corresponding to the holes 111 and 112 to enable the throttle pedal link to be bolted to the lever 108.

In explaining the operation of the mechanism, it will initially be assumed that the speed control or limiting system referred to above is inoperative, that is, the speed is below the upper limit.

In operation, therefore the driver's depression of his throttle pedal results in this movement being transmitted to the lever 108 so as to turn the lever 108 in an anti-clockwise direction about the axis 102. As it turns in this way, it of course carries the cover 140 with it. This angular movement tends to move the dowel 136 (carried by the lever 108) away from the dowel 134 (carried by the lever 100). However, this separation is resisted by the action of the spring 114 which transmits the angular movement of the lever 108 to the lever 100, and the two levers thus move effectively as a single unit about the axis 102 (in the anti-clockwise direction). This angular movement of the lever 100 is thus transmitted to the vehicle's fuel supply control and increases the fuel supply and thus the power of the engine.

As this motion takes place without any angular separation between the levers 100 and 108, the cable 122 and the casing 124 do not move relative to each other, and the movement of the lever 108 thus merely takes up slack in the cable assembly.

It will now be assumed that the speed reaches the upper limit because the driver is maintaining too high a setting of the fuel supply for the prevailing load on the engine. When the control system detects that the speed has reached the upper limit, its actuator will pull on the cable 122 and move the latter to the right, as viewed in FIGS. 5 and 7, within the casing 124. This movement will thus turn the lever 100 in a clockwise direction relative to the lever 108, this movement taking place against the action of the spring 114 and moving the lever 100 towards the dotted position shown in FIG. 5 (and thus separating the dowels 134 and 136). Thus, the fuel supply to the engine is reduced or closed off by an appropriate amount, and this action takes place in spite of the fact that the driver may attempt to maintain maximum fuel supply by use of his foot pedal.

When the speed once more comes back below the limit, the actuator of the control system releases the cable 122, and the levers 100 and 108 come back into the original relative position under the action of the spring 114, with the dowels 134 and 136 coming back into contact again.

Both of the mechanisms described (and particularly the mechanism shown in FIGS. 5 to 8) are designed to be simple replacements for the mechanism normally connecting the driver's throttle pedal with the engine's fuel supply system. In other words, the mechanisms are designed so that it is merely necessary to disconnect the rod or other link between the throttle pedal and the fuel supply control, attach the mechanism to the fuel supply control and then reconnect the throttle pedal link. The actuator forming part of the speed control or limiting system is then suitably mounted on the vehicle and connected to the mechanism by means of the cable 30 or 122. Finally, the actual control units of the speed control system are connected in position to control the operation of the actuator in dependence on the engine or vehicle speed. In this simple way, therefore, the mechanisms described enable a speed control or limiting system to be very simply fitted to existing vehicles.

It will be understood that the vehicle will be controlled to tend to run at a constant maximum speed if the driver maintains the throttle pedal fully depressed, the control system in such case pulling on the cable 30 or 122 to the extent necessary to prevent the vehicle falling below the maximum speed.

What is claimed is:

1. A mechanism for fitting between a fuel supply control of an engine and an operator's control which is movable by an operator to control the fuel supply to the engine by means of said fuel supply control, the mechanism comprising first and second members pivotally secured together for relative pivotal movement, the first member having means for connecting it to the said operator's control and the second member having means for connecting it to the fuel supply control, spring means biasing the members together such that they tend to move as one in response to movement of the operator's control which varies the engine's fuel supply via the said fuel supply control, and over-ride means connected between said first and second, said over-ride means comprising a cable movable within a casing, said cable being connected to one of said members and said casing being connected to the other of said members, said over-ride means being capable of applying a force between the members in response to an engine speed controlling signal, the force acting in opposition to said spring means and moving said second member relative to the first member to cause said fuel supply control to reduce the engine's fuel supply independently of the operator's control, the force being applied such that it acts simultaneously but in opposite directions on said first and second members whereby the force is not transmitted to the operator's control in the direction opposing a force exerted thereby which increases the engine's fuel supply.

2. A mechanism according to claim 1, in which
    the spring means is a coil spring connected to both said members and coiled around their pivotal axis,
    and including stop means for defining a datum relative position of the two said members into which position the members are biassed by the said spring.

3. A mechanism according to claim 1, in which the override means includes
    actuator means for controllably applying the said force between the members and
    a control system responsive to speed and operative to control the actuator means in dependence on the said speed whereby to adjust the engine's fuel supply in a manner tending to control or limit the said speed.

4. A mechanism according to claim 3, in which the said speed is the speed of the engine.

5. A mechanism according to claim 3, in which the said speed is the speed of a vehicle driven by the engine.

6. A mechanism according to claim 1, including a housing embracing both said members and forming a self-contained unit including said members.

7. A vehicle speed controlling system for retrofit to a vehicle after the disconnection from a fuel supply control on the engine of a link normally connected to the fuel supply control by which an operator's accelerator pedal controls the engine power, the system comprising
    a self-contained mechanical linkage unit, actuator means, and speed control means;
    said unit having a housing and, mounted within the housing, an input for mechanical connection to said link, an output for mechanical connection to the said fuel supply control, and an over-ride connection in the form of a cable movable within a cable casing, the cable being connected in use at one of its ends to said actuator means;
    the unit including within said housing first and second pivotally secured members, said first member being connected to said input and said second member being connected to said output, and a spring means connected between said members and biasing them into a datum relative position, the spring means being such that said members move as one in response to movement of said link which is thereby transmitted to the fuel supply control, said housing being connected to one of said members and moving therewith;

said cable being connected at the other of its ends to one of said members and said casing engaging the other of said members;

the speed control means being connectable to respond to speed whereby attainment of a limit speed causes the control means to drive the actuator means to apply, via the cable, a pulling force on said one of said members and, via the cable casing, an opposite pushing force on the other of said members whereby to create a force acting between the first and second members in opposition to the spring bias so that the second member moves relative to the first member and causes the fuel supply control to reduce the engine power irrespective of the position of the said link and without any resultant force being transmitted to the operator's control via the said link in a direction tending to oppose the operator's foot on the pedal.

8. A mechanism according to claim 7, in which the spring means is a coil spring wound around the pivotal axis of the said members and connected to each said member.

9. A mechanism according to claim 7, including stops respectively carried by the two said members and abutting each other to define the said datum relative position.

10. A mechanism according to claim 7, in which the said input is formed by a third member which is releasably clampable to the said first member for adjusting a datum position of the said link relative to a datum position of the said fuel supply varying device.

* * * * *